US007010064B2

(12) United States Patent
Penther

(10) Patent No.: US 7,010,064 B2
(45) Date of Patent: Mar. 7, 2006

(54) CHANNEL DELAY SPREAD ADAPTIVE EQUALIZATION AND DECODING

(75) Inventor: Bertrand Penther, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 660 days.

(21) Appl. No.: 09/912,545

(22) Filed: Jul. 26, 2001

(65) Prior Publication Data

US 2002/0167998 A1 Nov. 14, 2002

(30) Foreign Application Priority Data

Aug. 11, 2000 (EP) ................................ 00402273

(51) Int. Cl.

*H03D 1/00* (2006.01)
*H03D 1/04* (2006.01)
*H03B 1/10* (2006.01)
*H03H 7/30* (2006.01)

(52) U.S. Cl. ...................... 375/340; 375/350; 375/229; 375/346

(58) Field of Classification Search ................ 375/340, 375/229, 346, 348, 350
See application file for complete search history.

(56) References Cited

U.S. PATENT DOCUMENTS 5,414,738 A * 5/1995 Bienz ......................... 375/341
5,550,868 A * 8/1996 Boccuzzi .................... 375/330
6,028,899 A * 2/2000 Petersen ..................... 375/341
6,028,901 A * 2/2000 Huynh et al. ............... 375/350
6,246,732 B1 * 6/2001 Kobayashi et al. ......... 375/346
6,522,706 B1 * 2/2003 Bahai et al. ................ 375/343
6,763,076 B1 * 7/2004 Glavieux et al. ........... 375/346

OTHER PUBLICATIONS

Dan Raphaeli, et al., "Combined Turbo Equalization and Turbo Decoding", IEEE, Nov. 3, 1997, pp. 639-643.
M. Reinhardt, et al., "Turbo-Equalisation for Symbol-Spread Block Transmission System", Electronics Letters, GB, IEE, Stevenage, Herts, vol. 32 No. 25, Dec. 5, 1996, pp. 2321-2323.
Catherine Douillard, et al., "Iterative Correction of Intersymbol Interference: Turbo-Equalization", European Transactions on Telecommunications and Related Technologies, IT, AEI, Milano, vol. 6, No. 5, Sep.-Oct. 1995, pp. 507-511.
U.S. Appl. No. 09/912,545, filed Jul. 26, 2001, Pending.
U.S. Appl. No. 09/912,542, filed Jul. 26, 2001, Pending.

* cited by examiner

*Primary Examiner*—Stephen Chin
*Assistant Examiner*—Cicely Ware
(74) *Attorney, Agent, or Firm*—Oblon, Spivak, McClelland, Maier & Neustadt, P.C.

(57) ABSTRACT

The invention relates to a method for equalizing symbols received from a transmission channel and for decoding data therefrom, the method being by performing either a first processing comprising a turboequalizing sequence on the received symbols or a second processing comprising an equalizing step followed by a turbodecoding sequence, the selection of the first or the second processing being made upon an estimation of the delay spread of the transmission channel.

18 Claims, 3 Drawing Sheets

CHANNEL DELAY SPREAD ADAPTIVE EQUALIZATION AND DECODING

BACKGROUND OF THE INVENTION

1. Field of the Invention

The present invention concerns a method for equalizing symbols received from a transmission channel and decoding data therefrom. The invention more specifically concerns an equalization and decoding method which is adaptive to the delay spread of the transmission channel.

2. Description of the Related Art

Equalization is a well known method for removing Inter Symbol Interference (ISI) affecting a transmission channel.

The signal samples at the channel output can be expressed as:

$$R_k = \sum_{i=0}^{L-1} c_i D_{k-i} + \eta_k \quad (1)$$

where $c_i$ are the channel coefficients defining the impulse response of the transmission channel (CIR), L is the delay spread of the channel, $D_{k-i}$ is a M-ary modulated symbol and $\eta_k$ is the sampled additive white Gaussian (AWG) noise affecting the channel. From equation (1) the transmission channel can be viewed as a finite impulse response filter with L taps.

A first class of equalization methods is concerned with symbol-by-symbol equalization. A simple equalization method consists in using a transverse linear filter for cancelling the ISI. Of course, the tap coefficients of the transversal filter can be adapted to track the variations of the channel characteristics. However, linear equalization performs poorly due to the effect of noise enhancement. This effect is mitigated in nonlinear Decision Feedback Equalization (DFE). A decision feedback equalizer comprises two parts: a feedforward part identical to a transverse linear filter and a feedback part including a decision step on the received symbol. The feedback part estimates the ISI contributed by the previously decided symbols and subtracts this estimation from the transverse linear filter output before the decision on the current symbol is made.

A second class of equalization methods derives from a Maximum Likelihood Sequence approach called therefore Maximum Likelihood Sequence Estimation (MLSE). According to this approach, the discrete memory channel is modelled as a finite-state machine, the internal register of which having the length of the channel memory. The most likely transmitted sequence $D_k$, knowing the received sequence $R_k$ and the channel coefficients, is obtained by the Viterbi algorithm. Since the number of states of the trellis involved in the Viterbi algorithm grows exponentially with the channel memory length, several proposals have been made to reduce the number of states to be taken into account. In a first attempt to mitigate this effect, DDFSE (Delayed Decision Feedback Sequence Estimation) combines MLSE and DFE techniques by truncating the channel memory to a reduced number of terms and by removing in the branch metrics the tail of the ISI using a decision made on the surviving sequence at an earlier step (tentative decision). A further improvement with respect to error propagation, called RSSE, (Reduced State Sequence Estimation) was inspired by an Ungerboeck-like set partitioning principle. The RSSE algorithm was originally disclosed in the article of V. M. Eyuboglu et al. entitled “Reduce-state sequence estimation with set partitioning and decision feedback”, published in IEEE Trans. Commun., Vol. 36, pages 13–20, January 1988. Broadly speaking, in RSSE, the symbols are partitioned into subsets and Viterbi decoding is performed on a subset-trellis, a node or subset-state of the subset-trellis being a vector of subset labels (instead of a vector of symbols like in DDFSE). An advantage of RSSE over DDFSE is that it does not use tentative decisions but embeds the uncertainty of the channel response within the trellis structure.

Another possible way of relaxing the constraints in the decoding trellis is the list-type generalization of the Viterbi algorithm (GVA) proposed by T. Hashimoto in the article entitled “A list-type reduced-constraint generalization of the Viterbi algorithm” published in IEEE Trans. Inform. Theory, vol. IT-33, No 6, November 1987, pages 866–876. The Viterbi algorithm is generalized in the sense that, for a given state in the trellis diagram, a predetermined number S of paths (survivors) leading to that state, instead of a single one in the conventional Viterbi algorithm, are retained at each step. The retained paths are then extended by one branch corresponding to the assumed received symbol and the extended paths are submitted to a selection procedure leaving again S survivors per state. The GVA was applied to equalisation by Hashimoto himself in the above mentioned paper and a list-type Viterbi equalizer and later developed by Kubo et al. the article entitled “A List-output Viterbi equalizer with two kind of metric criteria” published in Proc. IEEE International Conference on Universal Personnal Comm. ’98, pages 1209–1213.

Both RSSE and LOVE (List Output Viterbi Equalization) can be regarded as particular cases of Per Survivor Processing (PSP) described in the article of R. Raheli et al. entitled “Per Survivor Processing” and published in Digital Signal Processing, No 3, July 1993, pages 175–187. PSP generally allows joint channel estimation and equalization by incorporating in the Viterbi algorithm a data aided estimation of the channel coefficients. This technique is particularly useful in mobile telecommunication for equalization of fast fading channels.

Recently, a new method of equalisation has been derived from the seminal principle of turbo-decoding discovered by C. Berrou , A. Glavieux, P. Thitimajshima, and set out in the article entitled “Near Shannon limit error-correcting coding and decoding: Turbo-coding”, ICC ’93, Vol. 2/3, May 1993, pages 1064–1071. This principle has been successfully applied to equalization by C. Douillard et al. as described in the article entitled “Iterative correction of Intersymbol Interference: Turbo-equalization” published in European Trans. Telecomm., Vol. 6, No 5, September/October 1995, pages 507–511.

The basic principle underlying turbo-equalization is that an ISI channel can be regarded as a convolutional coder and therefore the concatenation of a coder, an interleaver and the transmission channel itself can be considered as equivalent to a turbo-coder.

Turbo-equalization is based on an iterative joint equalization and channel decoding process. FIG. 1 shows an example of a transmission system using turbo-equalization. The transmitter comprises a systematic coder (100), e.g. a sytematic convolutional coder (K,R) where K is constraint length and R is the binary rate, which encodes the input data $I_k$ into error-control coded data $Y_n$, an interleaver (110) outputting interleaved data $Y_{n'}$ and a M-ary modulator (120), e.g. a BPSK modulator, or a QAM modulator. At the receiving side, the turbo-equalizer TE is represented with dotted lines. The symbols $R_{n'}$ affected by ISI are supplied to a soft equalizer (140) which outputs soft values $\Lambda_{n'}$ representing the reliability of the estimation of $Y_{n'}$. The soft equalization may be implemented by a Soft Output Viterbi Algorithm (SOVA) as described in the article of J. Hagenauer and P. Hoeher entitled "A Viterbi algorithm with soft-decision outputs and its applications" published in Proc. IEEE Globecom '89, pages 47.1.1–47.1.7. Alternately the Maximum A Posteriori (MAP) algorithm initially described in the article of L. Bahl, J. Cocke, F. Jelinek and J. Raviv published in IEEE on Information Theory, vol. IT-20, March 1974, pages 284–287 or a variant thereof (e.g. Log MAP, Max Log MAP) can be used. The latter algorithms will be globally referred to in the following as APP-type algorithms since they all provide the a posteriori probability for each bit to be decided. For example, the soft-equalizer of FIG. 1 implements the Log MAP algorithm which conveniently expresses the reliability information in the form of a Log Likelihood ratio $\Lambda_{n'}=\Lambda(Y_{n'})$. The soft values $\Lambda_{n'}$ are then de-interleaved by the deinterleaver (150) and supplied to a soft-output decoder which may be here again a SOVA decoder or an APP-type decoder. The soft decoder uses these soft values and the knowledge of the coding algorithm to form soft estimates $\Lambda_k=\Lambda(I_k)$ of the initial data $I_k$ which, in turn, permit to refine the estimation of the received symbols. For this, the latter estimates are passed back to the equalization stage. More precisely, the extrinsic information $Ext_k$ produced by the decoding stage, i.e. the contribution of that stage to the reliability of the estimation, is obtained by subtracting in (191) the soft-output from the soft-input of the decoder. The extrinsic information $Ext_k$ is then interleaved in interleaver (180) and fed back as a priori information to the soft equalizer (140). According to the principle of turbo-decoding, the extrinsic information derived from a stage must not be included in the soft input of the same stage. Hence, the extrinsic information $Ext_k$ is subtracted in (191) from the output of the soft equalizer. The iteration process repeats until the estimation converges or until a time limit is reached. The soft output of the decoder is then compared to a threshold (170) to provide a hard output, i.e. a decision $\hat{I}_k$ on the bit value.

The reduced state technique has been successfully transposed to the MAP algorithm with the view of applying it to turbo-equalization. In particular, a List-type MAP equalizer is described in unpublished French patent applications FR-A-0000207 and FR-A-0002066 filed by the Applicant on 4.1.2000 and 15.2.2000 respectively and included herein by reference.

The idea of joint channel estimation and equalization has also pervaded turbo-equalization. L. Davis, I. Collings and P. Hoeher have proposed in an article entitled "Joint MAP equalization and channel estimation for frequency-selective fast fading channels" published in Proc. IEEE Globecom '98, pages 53–58, a turboequalizer comprising a MAP equalizer making use of an expanded state trellis. The expansion of the state trellis beyond the channel memory length introduces additional degrees of freedom which are used for estimating the channel parameters. This method is more particularly useful for channels exhibiting fast varying characteristics, for example in the case of a transmission channel involving a high velocity mobile terminal.

Another possible structure of turboequalizer is described in the article of A. Glavieux et al. entitled "Turbo-equalization over a frequency selective channel", International Symposium on Turbo-codes", Brest, September 1997. In place of the MAP equalizer illustrated in FIG. 1, the first stage of the turboequalizer comprises a transversal linear filter for cancelling ISI from the received symbols in a decision directed mode followed by a M-ary to binary soft decoder.

Whatever the structure of the turbo-equalizer is, a problem arises in mobile telecommunication when the delay spread in the transmission channel is low or when it operates at low diversity. In such instance, the so-called "turbo-effect", i.e. the improvement of the estimation reliability over successive iterations, is significantly reduced. This phenomenon, which means that the gain between two consecutive iterations of the iterative process decreases for a given signal to noise ratio $E_b/N_0$ (where $E_b$ is the mean energy received per information bit and $N_0$ the noise bilateral spectral density) can be explained by the fact that turbo-equalization performs better on codes exhibiting large constraint lengths and that the delay spread of a channel can be regarded to some extent as equivalent to the constraint length of a code.

SUMMARY OF THE INVENTION

The object of the present invention is to propose an equalizing method and device which solve the above addressed problem.

The problem is solved by carrying out the method steps (resp. by implementing the technical features) recited in the characterising part of claim 1 (resp. claim 18)

BRIEF DESCRIPTION OF THE DRAWINGS

The invention will be better understood from a description of the various embodiments of the invention in relation to the following figures.

DETAILED DESCRIPTION OF THE INVENTION

The basic idea at the root of the invention is to switch from turbo-equalization to equalization and turbo-decoding when the delay spread of the transmission channel is too small for the turbo-equalization to perform efficiently. By delay spread, we understand a measure (e.g. a statistical measure) of the width of the power distribution of the channel impulse response. Conversely, when the delay spread is large enough, turbo-equalization is used. In other words, if the transmission channel provides enough "information redundance", a turbo-equalization is preferred while, in the opposite case, redundance is introduced at the coding stage and exploited by a turbo-decoder in the receiver. Roughly speaking, the invention can be regarded as a way of compensating for a small delay spread of the transmission channel.

Figure 1:
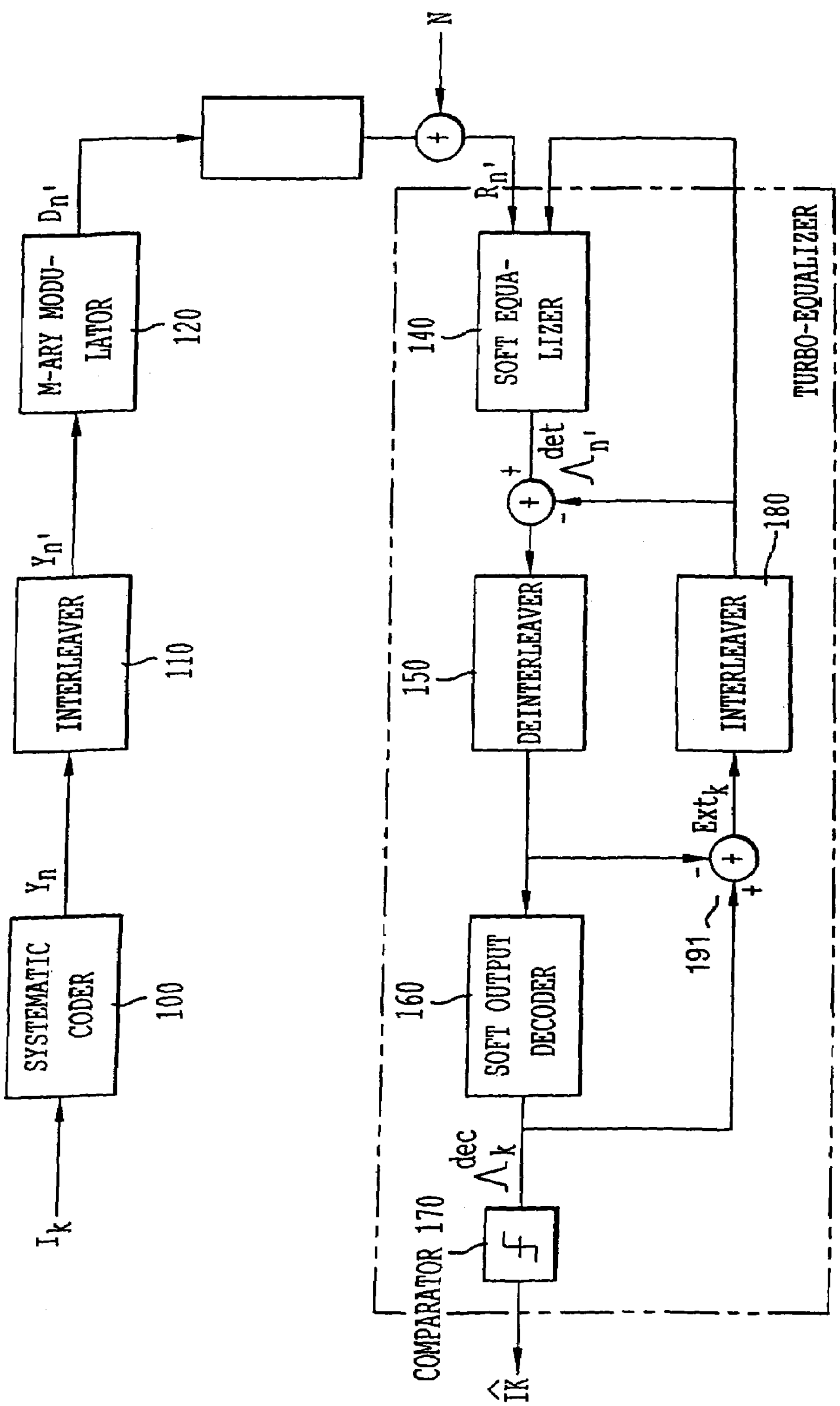
FIG. 1 schematically shows a known transmission system comprising a turbo-equalizer.
Figure 2:
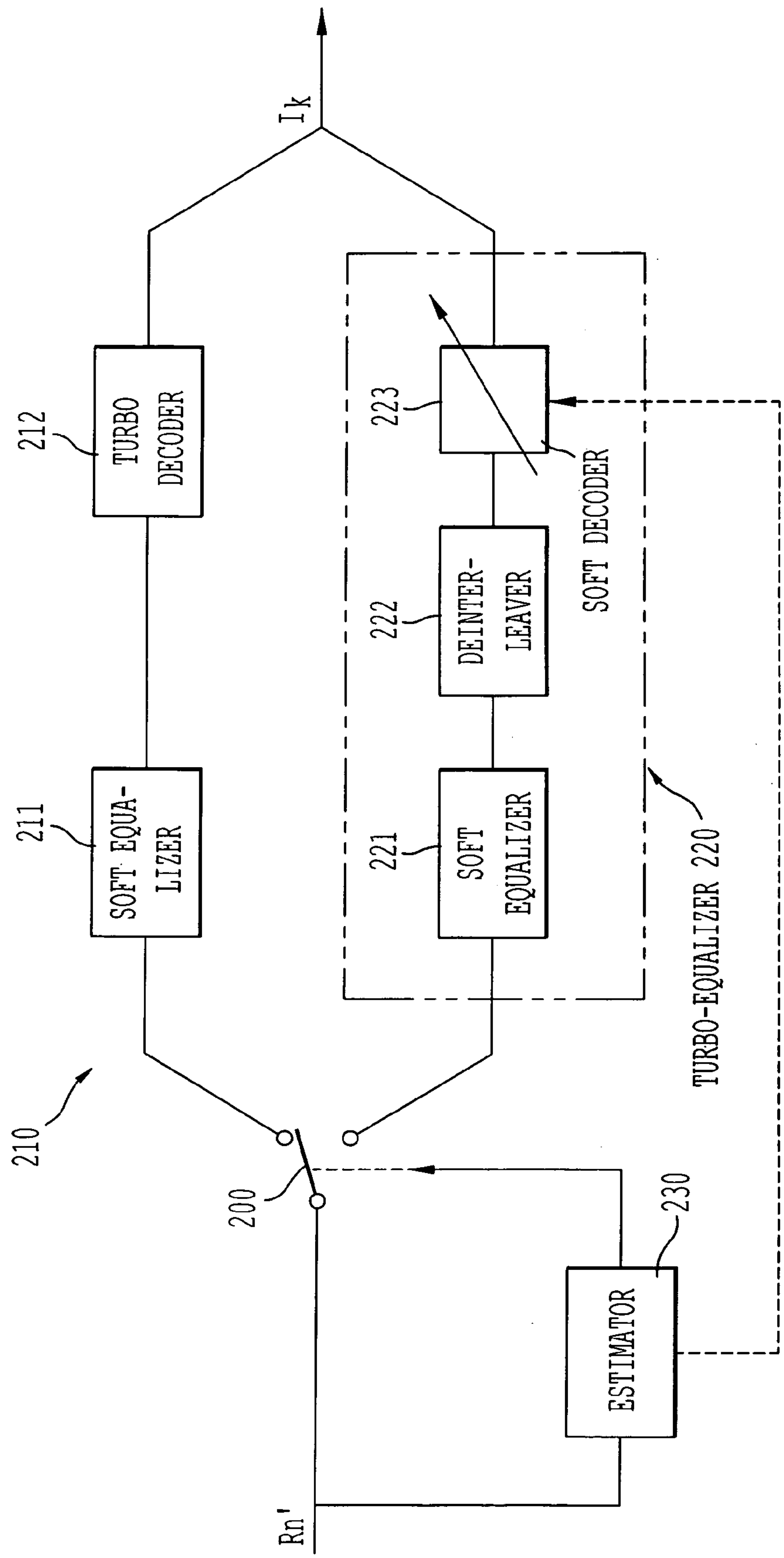
FIG. 2 schematically shows the structure of a receiver according to the invention.

As shown in FIG. 2 a switch (200) supplies the received symbols either to a lower processing branch (220) or to an upper processing branch (210). The lower processing branch includes a turbo-equalizer whereas the upper branch comprises a soft-equalizer (211) followed by a turbo-decoder (212). The switch (200) is controlled by an estimator (230) which estimates the delay spread of the transmission channel and compare it with a predetermined threshold. If the delay spread lies above the threshold, the lower branch is selected and, conversely, if the delay spread lies under the threshold, the upper branch is selected. Advantageously, hysteresis is provided by employing two thresholds. When the delay spread rises above a first threshold, the lower branch is selected whereas when it falls under a second threshold the upper branch is selected. Alternately, a minimum time interval between consecutive transitions will be provided in order to avoid chattering.

The soft-equalizer used in the upper branch of the receiver may be an equalizer of the APP-type or a conventional equalizer followed by an M-ary to binary soft converter.

The soft-equalizer used within the turbo-equalizer may be of the APP type and preferably is a Log MAP equalizer. In a first embodiment, the number of states in the APP trellis is equal to $M^{L-1}$ where M is size of the modulation alphabet and L is the delay spread, i.e. the constraint length of the channel (the size of the channel memory is equal to L−1) expressed in a number of samples. For a large memory length however, a second embodiment using a reduced state technique is preferred. The number of states taken into account is then reduced to $M^{J-1}$ by truncating the constraint length to a strictly positive integer, J<L (the size of the channel memory is truncated to J−1). For example, a List-type APP equalizer as disclosed in the above mentioned patent applications can serve this purpose. In contrast, an expanded state trellis may be opted for in case of fast varying characteristics of the transmission channel. In such instance, the higher number of states in the trellis, $M^{J-1}$ where J>L enables a joint estimation of the channel coefficients and of the data.

Advantageously, the value of J will be varied with respect to the propagation conditions, in particular the shape (e.g. the power profile) of the channel response. For example, in the case of a mobile telecommunication channel, if the propagation involves a Line of Sight component, in other words if the channel is affected by Ricean dispersion, a reduced state trellis (J<L) could be used. On the other hand, if the velocity of the mobile terminal is higher than a given threshold and, hence, the channel suffers from fast-fading, an expanded state trellis (J>L) could be chosen.

Preferably, the value of the constraint length K will be varied in accordance with L (and more generally with J). In this embodiment the soft decoder (223) (and the associated coder at the transmitter side as will be shown below) is reconfigurable to accommodate to different values of K and hence different trellis sizes. K is increased when L decreases whereas K is decreased when L increases, along the same compensation principle set out above.

Preferably, all the steps of turbo-equalisation will be performed by a single digital programmable device like a digital signal processor and the turbo-equalization process will be optimized under a complexity constrain as described in copending European patent application entitled "Resource constrained turbo-equalization" filed by the Applicant. The complexity of the soft equalizer (221), the deinterleaver (222) and the soft decoder (223) are then bound by a maximum complexity value. Since the complexity of the deinterleaver does not need to be varied when K or J varies, the complexity constraint can be expressed as:

$$a.2^{K-1}+b.M^{J-1}<C_{max} \quad (2)$$

when the soft equalizer (221) is a MAP equalizer and $$a.2^{K-1}+b'.L<C_{max} \quad (3)$$

when the soft equalizer (221) is based on a transversal linear filter with L taps. The term $2^{K-1}$ accounts for the complexity of the MAP decoder, the term $M^{J-1}$ accounts for the complexity of the MAP equalizer and a,b,b' are fixed coefficients. Preferably, for a given L or J, K is chosen as the highest possible integer meeting the constraint (2) or (3).

According to a further embodiment, the number N of iterations of the turbo-equalization process is made variable. The BER gain achieved by turbo-equalization increases with the number N of iterations. Hence, it may be desirable to increase N while the constraint on an available resource (e.g. the processing power of the DSP) is met. In general, the amount of processing power required by turbo-equalization increases linearly versus N (in some instances, however, the DSP may benefit from parallel computation and the increase versus N may be less than linear) and the constraints (2) and (3) have to be replaced by (2') and (3') respectively:

$$N.(a.2^{K-1}+b.M^{J-1})<C_{max} \quad (2')$$

$$N.(a.2^{K-1}+b'.L)<C_{max} \quad (3')$$

In both cases, at least one of K and N is chosen to meet the resource constraint (2') or (3').

Figure 3:
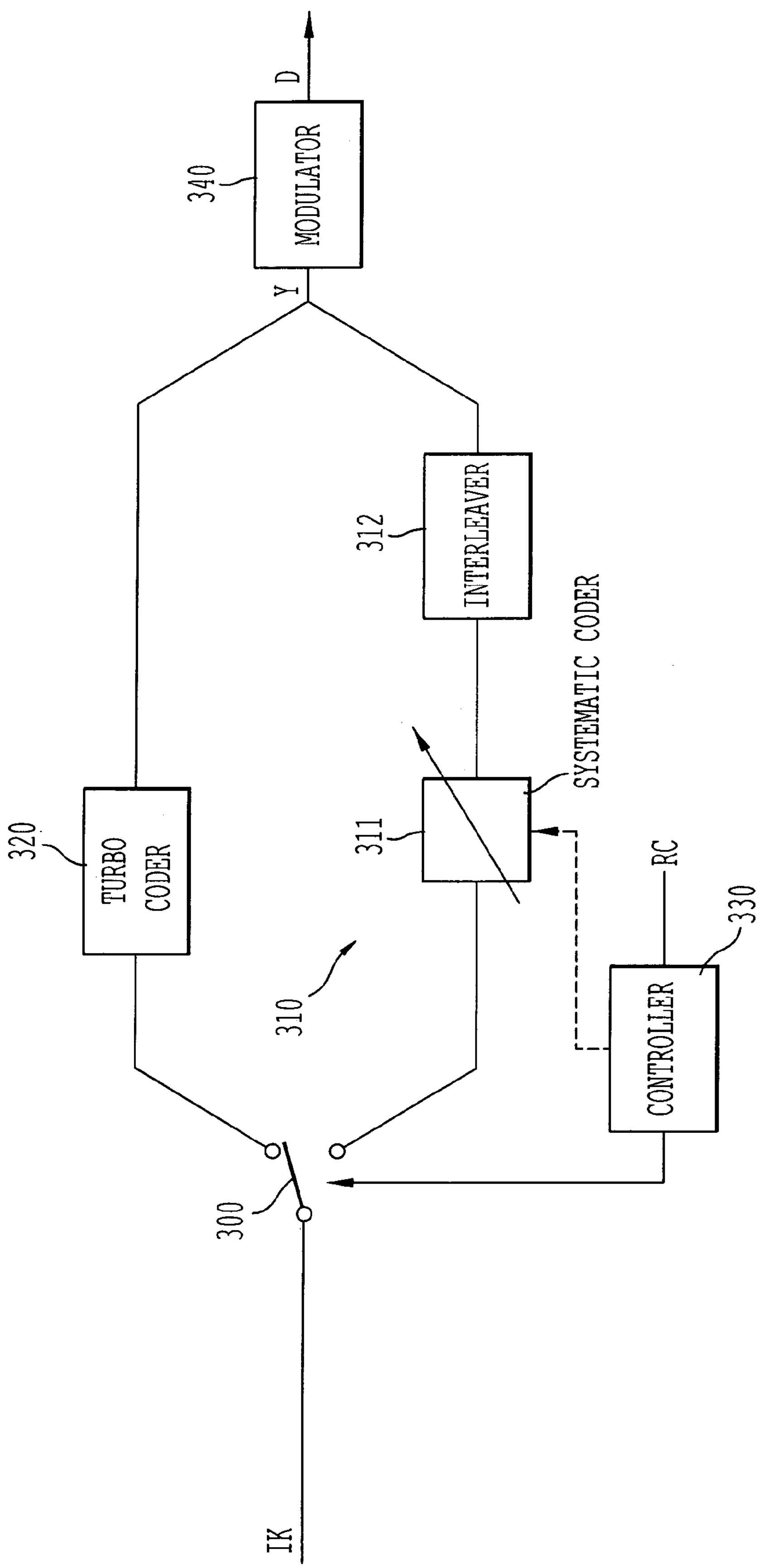
FIG. 3 schematically shows the structure of a transmitter according to the invention.

FIG. 3 schematically shows the structure of a transmitter for use with the receiver of FIG. 2

The transmitter comprises a switch (300) directing the data $I_k$ to be coded either to a turbocoder (320) or to a systematic coder (311) in series with an interleaver (312). The upper branch and the lower branch outputs are both connected to the input of the modulator (340). If the receiver operates in a pure switching mode, it sends a switch position signal to the transmitter over a reverse channel RC (e.g. the dedicated physical control channel (DPCCH) in a mobile telecommunication system). This signal is received by the controller (330) which controls the switch accordingly.

Advantageously, the constraint length K of the coder can be made variable. When the receiver decides to modify the value of the constraint length K upon a change of L (or J), it sends a request back to the transmitter for increasing or decreasing K. The request is transmitted over the reverse channel and received by the controller (330). The controller increments or decrements K accordingly and updates the constraint value of the coder.

In addition, the controller may control the transmission power of the transmitter. Indeed, an increase of K results in a lower BER. Hence, it is possible to lower the signal to noise ratio at the receiving side while keeping an acceptable BER target level. This measure is particularly prescribed for lowering the interference level in a cellular telecommunication system.

Although parts of the description describe the method according to the invention in terms of processing blocks (e.g. an encoder, an interleaver, a modulator etc.), it should be clear for the man skilled in the art that these blocks are represented as a matter of convenience only and that some or all the processing steps can be carried out by a single or a plurality of digital data processors.

The invention claimed is:

1. A method for equalizing symbols received from a transmission channel and for decoding data therefrom, comprising:

performing one of a first processing, which includes performing a turboequalizing sequence on the received symbols and a second processing, which includes equalizing the received symbols and applying a turbodecoding sequence to the received symbols; and performing the first processing when a value of a delay spread of the transmission channel rises above a first threshold and performing the second processing when the value of the delay spread falls under a second threshold.

2. The method of claim 1, wherein the turboequalizing sequence comprises:

performing an iteration of a soft equalization on the received symbols according to an APP algorithm;

deinterleaving the received symbols; and soft decoding the received symbols.

3. The method of claim 2, wherein the APP algorithm is a MAP algorithm.

4. The method of claim 2, wherein a number of states of a trellis of the APP algorithm is equal to $M^{J-1}$, where M is a modulation alphabet size used over the transmission channel and J is a positive integer which is chosen according to a characteristic of the transmission channel.

5. The method of claim 4, wherein a value of J is chosen to be higher than a value of said delay spread of the transmission channel, if the transmission channel is affected by fast fading.

6. The method of claim 4, wherein a value of J is chosen to be lower than a value of said delay spread of the transmission channel, if propagation involves a Line of Sight component.

7. The method of claim 4, wherein a value of J is chosen according to a power profile of a channel impulse response.

8. The method of claim 5, 6 or 7, wherein said soft decoding is based upon an APP type algorithm involving $2^{K-1}$ states, K being increased when J decreases and K being decreased when J increases.

9. The method of claim 5, 6, or 7, wherein K is determined as the highest integer for which $a*2^{k-1}+b*M^{j-1}$, where a and b are fixed coefficients, is lower than a predetermined resource value.

10. The method of claim 5, 6, or 7, wherein at least one of K and N, a number of iterations of the turbo-equalizing sequences, is adapted so that $N*(a*2^{k-1}+b*M^{j-1})$, where a and b are fixed coefficients, is lower than a predetermined resource value.

11. The method of claim 1 wherein the turboequalizing sequence comprises:

performing an iteration of a soft equalizing of the received symbols, which includes, filtering the received symbols to cancel intersymbol interference over the transmission channel, the filtering including L taps, where L is a variable parameter given by the delay spread of the transmission channel;

deinterleaving the received symbols; and soft decoding the received symbols.

12. The method of claim 11, wherein said soft decoding is based upon an APP type algorithm involving $2^{K-1}$ states, where K is chosen as the highest integer for which $a*2^{k-1}+b'*L$, where a and b' are fixed coefficients, is lower than a predetermined resource value.

13. The method of claim 11, wherein at least one of K and N, a number of iterations of the turbo-equalizing sequence, is adapted so that $N*(a*2^{K-1}+b'*L)$, where a and b' are fixed coefficients is lower than a predetermined resource value.

14. A method for coding data, comprising:

performing either a first processing, which includes, coding the data using a convolutional code that includes a variable constraint length, and interleaving the data, or performing a second processing, which includes turbocoding said data, wherein the selection of the first or the second processing is made upon information relative to the delay spread of the transmission channel.

15. A receiver comprising:

a processing device configured to perform one of a turboequalizing sequence on received symbols, and equalizing of received symbols along with a turbodecoding sequence on the received symbols, wherein the turboequalizing sequence is performed when a value of a delay spread of a transmission channel rises above a first threshold and equalize received symbols and perform a turbocoding sequence on the received symbols is performed when the value of the delay spread falls under a second threshold.

16. A transmitter comprising:

a processing device configured to perform one of turbocode data, and interleave data and code data, wherein the code is a convolutional code that includes a variable constraint length, means for selecting of turbocode data, and interleave data and code data is made upon information relative to a delay spread of a transmission channel.

17. A telecommunications system comprising:

a transmitter and a receiver, the transmitter including a processing device configured to perform one of turbocode data, and interleave data and code data, wherein the code is a convolutional code that includes a variable constraint length, wherein a selection of turbocode data, and interleave data and code data is made upon information relative to a delay spread of a transmission channel, the receiver including a processing device configured to perform one of a turboequalizing sequence on received symbols, and equalizing received symbols along with a turbodecoding sequence on the received symbols, wherein the turboequalizing sequence is performed when a value of a delay spread of a transmission channel rises above a first threshold and equalize received symbols and perform a turbocoding sequence on the received symbols is performed when the value of the delay spread falls under a second threshold, wherein the receiver sends back to the transmitter said information relative to a delay spread of a transmission channel.

18. The telecommunication system of claim 17, wherein the transmitter further comprises a convolutional coder whose constraint length is increased or decreased upon a request from the receiver.

* * * * *